(12) United States Patent
Natsukawa

(10) Patent No.: US 10,044,535 B2
(45) Date of Patent: Aug. 7, 2018

(54) SERIAL COMMUNICATION APPARATUS, COMMUNICATION SYSTEM, AND METHOD FOR COMMUNICATION

(71) Applicant: Noriyuki Natsukawa, Kanagawa (JP)

(72) Inventor: Noriyuki Natsukawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/238,482

(22) Filed: Aug. 16, 2016

(65) Prior Publication Data

US 2017/0063521 A1    Mar. 2, 2017

(30) Foreign Application Priority Data

Sep. 2, 2015    (JP) .................. 2015-173182

(51) Int. Cl.
  *H04L 25/49*  (2006.01)
  *H04L 7/04*   (2006.01)
  *H04L 25/14*  (2006.01)

(52) U.S. Cl.
  CPC .............. *H04L 25/49* (2013.01); *H04L 7/04* (2013.01); *H04L 25/14* (2013.01)

(58) Field of Classification Search
  CPC ............ H04L 25/49; H04L 7/04; H04L 25/14
  See application file for complete search history.

(56) References Cited

U.S. PATENT DOCUMENTS

| 2014/0300755 | A1* | 10/2014 | Funamoto | ............. H04L 1/0045 |
| | | | | 348/187 |
| 2015/0030326 | A1* | 1/2015 | Yang | ....................... H04L 12/12 |
| | | | | 398/45 |
| 2015/0222290 | A1* | 8/2015 | Miyadera | ................ H03M 9/00 |
| | | | | 347/224 |
| 2016/0006905 | A1* | 1/2016 | Okita | .................... H04N 5/3696 |
| | | | | 348/241 |

FOREIGN PATENT DOCUMENTS

| JP | 2010-114762 | 5/2010 |
| JP | 2015-146525 | 8/2015 |

OTHER PUBLICATIONS

U.S. Appl. No. 15/185,687, filed Jun. 17, 2016.

* cited by examiner

*Primary Examiner* — Jaison Joseph
(74) *Attorney, Agent, or Firm* — Duft Bornsen & Fettig LLP

(57) ABSTRACT

A serial communication apparatus includes an adder configured to add a start code and a length code to a head of data, a transmitter configured to convert the data together with the added start code and the added length code into a serial format and to transmit the converted data including the start code and the length code, a receiver configured to receive the converted data transmitted from the transmitter, and a processor configured to detect the start code and the length code included in the received converted data, to specify the head of the data based on the detected start code, (Continued)

to specify a tail of the data based on the detected start code and the detected length code, and to process the converted data based on the specified head and the specified tail of the data.

7 Claims, 9 Drawing Sheets

FIG.3

| SYMBOL NAME | DATA BYTE NAME | DATA BYTE VALUE (HEX) | 8B [HGF EDCBA] | 10B RD− [abcdei fghj] | 10B RD+ [abcdei fghj] | DESCRIPTION |
|---|---|---|---|---|---|---|
| COM | K28.5 | BC | 101 11100 | 001111 1010 | 110000 0101 | DATA BETWEEN LINES (DES SYNCHRONIZE SYMBOL) |
| STP1 | K23.7 | F7 | 111 10111 | 111010 1000 | 000101 0111 | LINE DATA START SYMBOL 1 |
| STP2 | K27.7 | FB | 111 11011 | 110110 1000 | 001001 0111 | LINE DATA START SYMBOL 2 |
| STP3 | K29.7 | FD | 111 11101 | 101110 1000 | 010001 0111 | LINE DATA START SYMBOL 3 |
| STP4 | K30.7 | FE | 111 11110 | 011110 1000 | 100001 0111 | LINE DATA START SYMBOL 4 |
| STP5 | K28.7 | FC | 111 11100 | 001111 1000 | 110000 0111 | LINE DATA START SYMBOL 5 |
| END1 | K28.0 | 1C | 000 11100 | 001111 0100 | 110000 1011 | LINE DATA END SYMBOL 1 |
| END2 | K28.1 | 3C | 001 11100 | 001111 1001 | 110000 0110 | LINE DATA END SYMBOL 2 |
| END3 | K28.2 | 5C | 010 11100 | 001111 0101 | 110000 1010 | LINE DATA END SYMBOL 3 |
| END4 | K28.3 | 7C | 011 11100 | 001111 0011 | 110000 1100 | LINE DATA END SYMBOL 4 |
| END5 | K28.4 | 9C | 100 11100 | 001111 0010 | 110000 1101 | LINE DATA END SYMBOL 5 |
| — | K28.6 | DC | 110 11100 | 001111 0110 | 110000 1001 | — |

SERIAL COMMUNICATION APPARATUS, COMMUNICATION SYSTEM, AND METHOD FOR COMMUNICATION

CROSS-REFERENCE TO RELATED APPLICATIONS

The present application claims the benefit of priority under 35 U.S.C. § 119 of Japanese Patent Application No. 2015-173182, filed Sep. 2, 2015, the contents of which are incorporated herein by reference in their entirety.

BACKGROUND OF THE INVENTION

1. Field of the Invention

The present disclosure relates to serial communication apparatuses, communication systems, and methods for communication.

2. Description of the Related Art

High-speed serial communication using control codes disposed on the head and the tail of image data is known in the art.

For example, for transmission of image data, a transmitter adds multiple start codes to the head of the image data and adds multiple end codes to the tail of the image data, whereas a receiver detects the start codes and the end codes so as to extract the image data (for example, see Japanese Unexamined Patent Application Publication No. 2010-114762).

SUMMARY OF THE INVENTION

One aspect of the present invention provides a serial communication apparatus including an adder configured to add a start code and a length code to a head of data, the start code indicating the head of the data and the length code indicating a length of the data, a transmitter configured to convert the data together with the added start code and the added length code into a serial format and to transmit the converted data including the start code and the length code, a receiver configured to receive the converted data transmitted from the transmitter, and a processor configured to detect the start code and the length code included in the received converted data, to specify the head of the data based on the detected start code, to specify a tail of the data based on the detected start code and the detected length code, and to process the converted data based on the specified head and the specified tail of the data.

BRIEF DESCRIPTION OF THE DRAWINGS

FIG. 3 is a drawing illustrating an example of a conversion table for control codes according to the first embodiment;

DESCRIPTION OF THE EMBODIMENTS

In the background art, a receiver needs a large scale circuit for deserializing because of a buffer region required for removing both start codes and end codes, which causes energy consumption to increase. Specifically, when performing deframe processing, high-frequency operative circuits are required for processing redundant end codes, which causes energy consumption to become larger.

Therefore, the object of the present invention is simplifying the detection processing of the tail of valid data performed by a receiver, so as to reduce energy consumption.

In the following, embodiments of the present invention will be explained with reference to accompanying drawings. Here, in the description and the drawings, a constituent element having practically the same functional configuration is assigned with the same reference sign, so as to omit a repeated explanation.

First Embodiment

Figure 1:
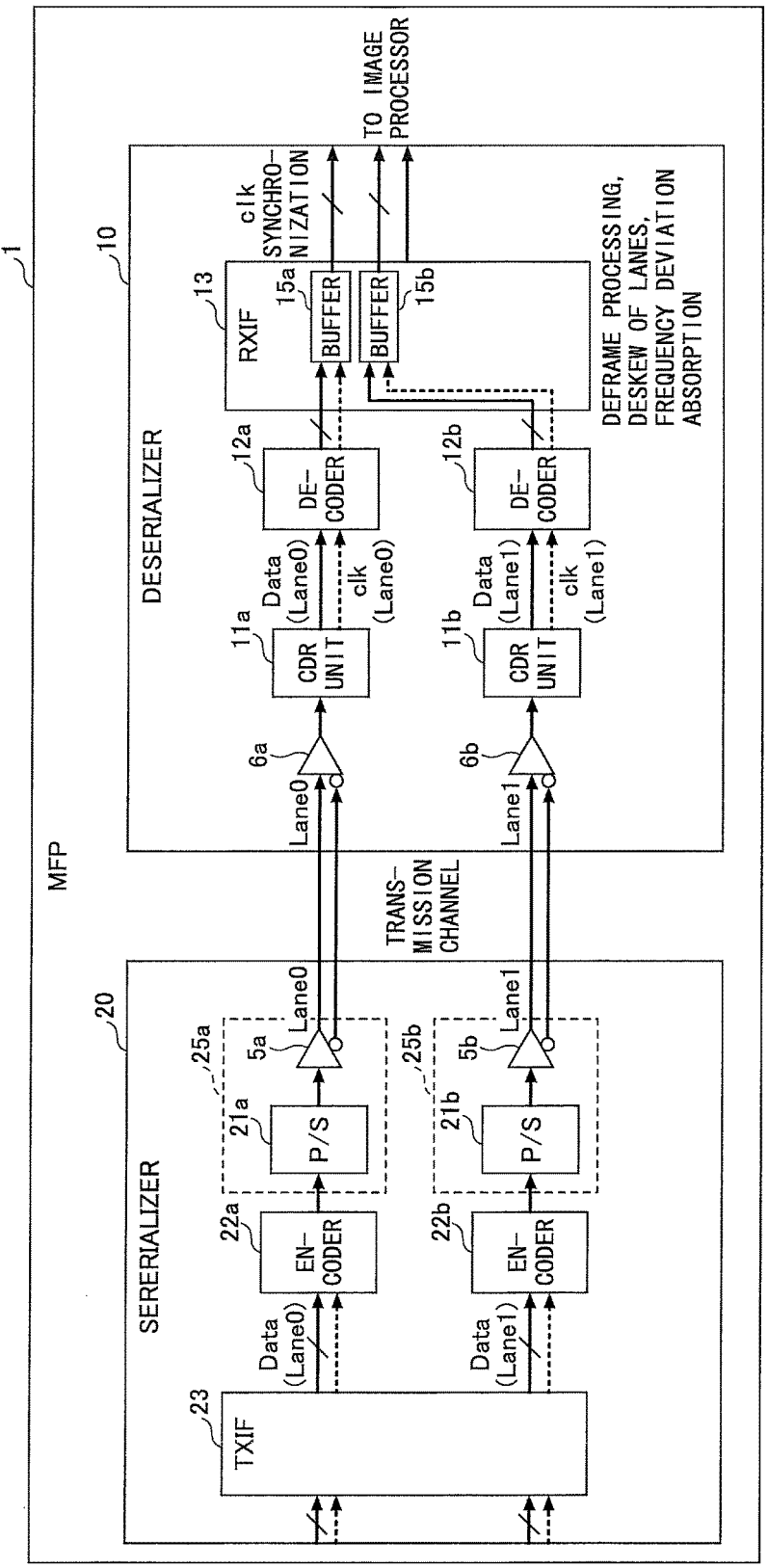
FIG. 1 is a drawing illustrating an example of a configuration of a serial communication apparatus for performing serial transmission according to a first embodiment.

FIG. 1 is a drawing illustrating an example of a serial communication apparatus for performing serial transmission. The serial communication apparatus 1 includes a serializer (SER) 20 and a deserializer (DES) 10. In the example of FIG. 1, the serial communication apparatus 1 converts image data into serial data, and then transmits the data from the SER 20 to the DES 10 through two transmission channels. The SER 20 includes encoders 22a and 22b, a transmission interface (TXIF) 23, and serial transmitters 25a and 25b. The serial transmitter 25a includes a parallel/serial (P/S) converter 21a and a driver 5a, whereas the serial transmitter 25b includes a P/S converter 21b and a driver 5b.

Furthermore, the DES 10 includes receivers 6a and 6b, clock data recovery (CDR) units 11a and 11b, decoders 12a and 12b, and a reception interface (RXIF) 13. Further, the RXIF 13 includes buffers 15a and 15b.

The serial communication apparatus 1 is applicable to, for example, a multifunction printer (MFP) having the SER 20 disposed on a scanner and having the DES 10 disposed on a plotter. In such a case, serial transmission is performed between the scanner and the plotter. Moreover, the configuration illustrated in FIG. 1 is applicable to a variety of apparatuses and systems, other than MFPs.

The TXIF 23 is an interface for performing serial transmission. The TXIF 23 generates a variable length code by adding multiple control codes to the head of 8-bit parallel data (image data). For example, in a case where image data include four color data, i.e., black, magenta, cyan, and yellow, the TXIF 23 generates a variable length code relating to each of the four color data. Here, the TXIF 23 may further include a skew adjustment function.

A control code consists of a comma (COM) code, a length code, and a start code. The multiple control codes added to the head of the image data are referred to as a start transmission line pulse (STP) frame. Here, according to the first embodiment, an END code (end code) need not be added to the tail of the image data.

Figure 2:
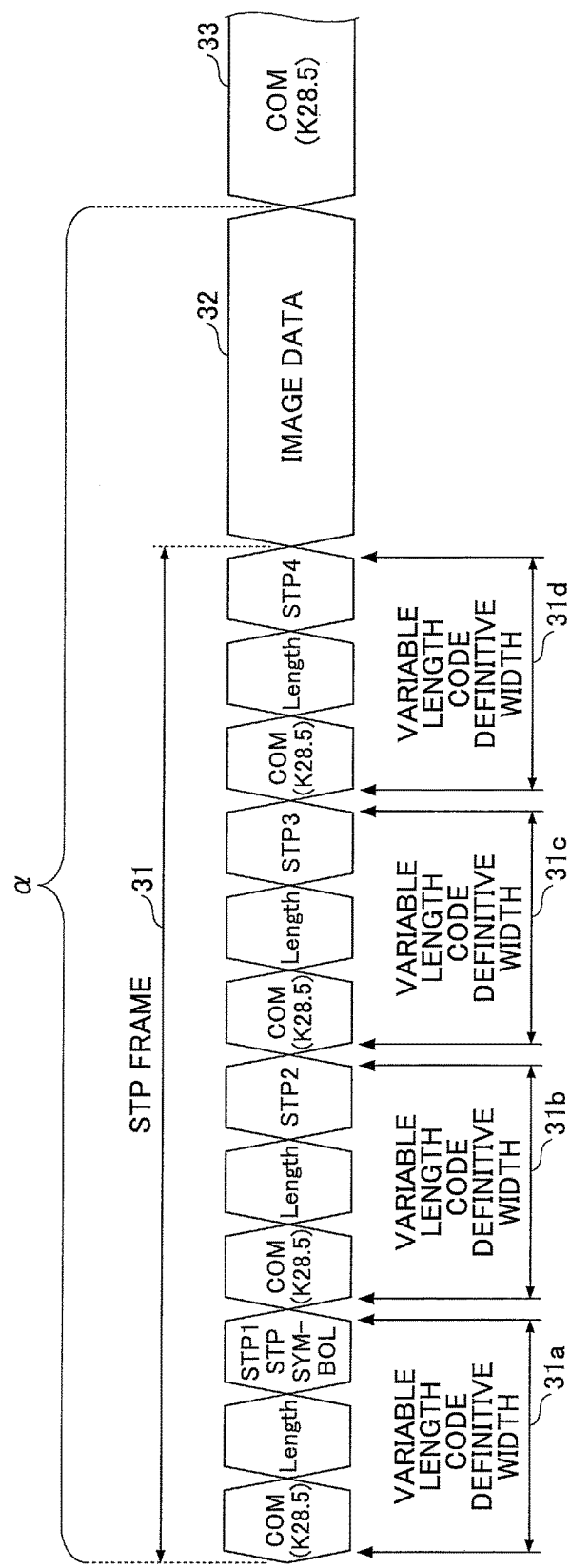
FIG. 2 is a drawing illustrating a first example of a variable length code according to the first embodiment.

FIG. 2 is a drawing illustrating the first example of the variable length code α. For example, a variable length code α is constituted by a combination of an STP frame 31 and the image data 32. Here, according to the first embodiment, an END code need not be added on the tail of the image data 32.

A COM code 33 is disposed between the variable length code α and another variable length code adjacent to the variable length code α. The STP frame 31 is constituted by combinations of COM codes, length codes (referred to as "Length" in FIG. 3), and STP codes. COM codes are disposed between STP codes in other control codes and length codes in the same control codes, respectively. In such a way, distances are provided between the adjacent STP codes and length codes, so that the STP codes and the length codes are detected more easily.

The length codes indicate the length of data to be transmitted (for example, the image data 32). The STP codes indicate the head position of data to be transmitted (for example, the image data 32). Here, although the number of combinations of COM codes, length codes (Length), and STP codes which constitute the STP frame 31 is four in the explained example, the number of the combinations may be more than five and less than three.

Referring back to FIG. 1, the encoder 22a converts 8-bit parallel data of the variable length code α into 10-bit parallel data, based on a predetermined conversion table. For example, the encoder 22a converts 8-bit control codes (for example, STP codes, COM codes, etc.) into 10-bit control codes, based on the conversion table as illustrated in FIG. 3, and then converts 8-bit image data into 10-bit image data, based on a publicly known conversion table for data conversion (not illustrated in drawings). Similarly to the encoder 22a, the encoder 22b converts 8-bit parallel data of the variable length code α into 10-bit parallel data, based on such predetermined conversion tables.

Here, although 8B/10B conversion is performed as an example in the first embodiment, the encoding type is not limited to 8B/10B conversion. The encoding type may be 64B/66B, 64B/67B, or 128B/130B conversion, as well as transmission minimized differential signaling (TMDS), etc.

FIG. 3 is a drawing illustrating an example of the conversion table for control codes. "SYMBOL NAME" is the kind of a symbol code. The number of provided symbol codes is twelve: one of the symbol codes is assigned to a COM code, five of the symbol codes are assigned to the STP codes (STP1 though STP5), and another five of the symbol codes are assigned to END codes (END1 through END5), respectively. Here, the STP codes are start codes, whereas END codes are end codes. The COM code is a code disposed between variable length codes. The COM code is assigned with "K28.5", which consists of bits of five continuous 0 or 1, so as that the adjacent another variable length code is easily detected. "DATA BYTE NAME" is the name of symbol codes. "DATA BYTE VALUE (HEX)" is an 8-bit symbol code indicated in a hexadecimal number. "8B" is an 8-bit symbol code. "10B" is a 10-bit symbol code that is either polarity RD (running disparity)+ or polarity RD−, which corresponds to each of the 8-bit symbol codes. The encoders 22a and 22b assign 8-bit symbol codes with 10-bit symbol codes of polarity RD+ or polarity RD−, based on a predetermined rule. A symbol code of polarity RD− is an inverted bit sequence of corresponding polarity RD+.

For example, the encoder 22a alternately assigns symbol codes of polarity RD+ and a polarity RD− in order to avoid bits of a determined number of (for example, five) continuous 0s or 1s, so as to maintain steady serial communication. Here, the encoder 22a may be arranged so as not to assign a symbol code having bits of five continuous 0s or 1s, such as STP5.

Furthermore, similarly to the encoder 22a, the encoder 22b alternately assigns symbol codes of polarity RD+ and polarity RD−. Further, similarly to the control codes (K code) such as the STP codes and the COM code, image data (D code) may be alternately assigned with symbol codes of positive polarity and negative polarity.

Referring back to FIG. 1, the P/S converter 21a divides each of 10-bit parallel data relating to the variable length code α into single bits, so as to convert the 10-bit parallel data into 10-bit serial data. For example, in a case of dealing with image data including four color data, i.e., black, magenta, cyan, and yellow, the P/S converter 21a divides 10-bit parallel data relating to each of black and magenta into single bits, so as to convert the 10-bit parallel data into 10-bit serial data. Similarly, the P/S converter 21b divides 10-bit parallel data relating to each of cyan and yellow into single bits, so as to convert the 10-bit parallel data into 10-bit serial data. Here, the P/S converters 21a and 21b may be arranged to perform emphasis processing on the serial data.

Subsequently, the P/S converter 21a transmits serial data from the driver 5a to the DES 10 through Lane0. The P/S converter 21b transmits serial data from the driver 5b to the DES 10 through Lane1.

Here, the driver 5a transmits serial data as well as reversed data having the reversed phase of the serial data through Lane0. The driver 5b transmits serial data in the same transmission method. The P/S converter 21a and the driver 5a may together be referred to as the serial transmitter 25a. Further, the P/S converter 21b and the driver 5b may together be referred to as the serial transmitter 25b.

The CDR unit 11a in the DES 10 regenerates serial data based on a differential signal received by the receiver 6a through Lane0, and then extracts a clock signal embedded in the serial data, so as to divide the clock signal and the serial data. The CDR unit 11a provides the extracted clock signal and the serial data to the decoder 12a.

Similarly to the CDR unit 11a, the CDR unit 11b provides extracted clock signal and serial data to the decoder 12b.

The decoder 12a converts the serial data into parallel data. Then, the decoder 12a converts 10-bit parallel data relating to the variable length data α into 8-bit parallel data, based on a predetermined conversion table. The decoder 12a may be arranged so as to convert 10-bit parallel data relating to the variable length data α into 8-bit parallel data, based on the predetermined conversion table illustrated in FIG. 3. Then, the decoder 12a outputs the decoded 8-bit parallel data (the variable length code α) to the buffer 15a.

Similarly to the decoder 12a, the decoder 12b processes serial data, and then outputs decoded 8-bit parallel data to the buffer 15b.

The RXIF 13 includes the buffers 15a and 15b. The RXIF 13 detects STP codes disposed in the STP frame 31, so as to specify the head position of image data based on the STP codes. Furthermore, the RXIF 13 detects length codes, so as to specify the tail position of the image data based on the STP codes and the detected length codes. For example, the RXIF 13 adds a data length of image data indicated by a length code to the address of the head of the image data indicated by a STP code, so as to calculate the address of the tail of the image data. Subsequently, the RXIF 13 performs deframe processing in order to remove the STP frame 31 from the variable length code α. Then, the RXIF 13 outputs the image data to the buffers 15a and 15b.

The RXIF 13 specifies the head and the tail of image data in a condition where a predetermined number of STP codes and length codes are detected. Alternatively, the RXIF 13 may be arranged to specify the head and the tail of image data in a condition where all STP codes and length codes are detected.

At the time of outputting the detected tail of the image data to the buffers 15a and 15b, the RXIF 13 initiates read processing from the buffers 15a and 15b. The RXIF 13 transmits the image data stored in the buffers 15a and 15b to a later-described image processor (not illustrated in the drawings). Here, the data in the buffers 15a and 15b are synchronized per clock.

Furthermore, the RXIF 13 sets a read pointer (rptr) at the head position of image data and sets a write pointer (wptr) at the tail of the image data. The RXIF 13 calculates the difference between the addresses of the rptr and the wptr, in order to acquire the buffered size of the image data. The RXIF 13 may be arranged to initiate read processing even before the tail of the image data is output to the buffers 15a and 15b, in a case where the buffered size of the image data exceeds a predetermined amount.

The RXIF 13 performs deskew adjustment in the event of a data transmission delay in Lane0 or Lane1. Furthermore, the RXIF 13 performs frequency adjustment in the event of a frequency deviation in Lane0 or Lane1.

Figure 4:
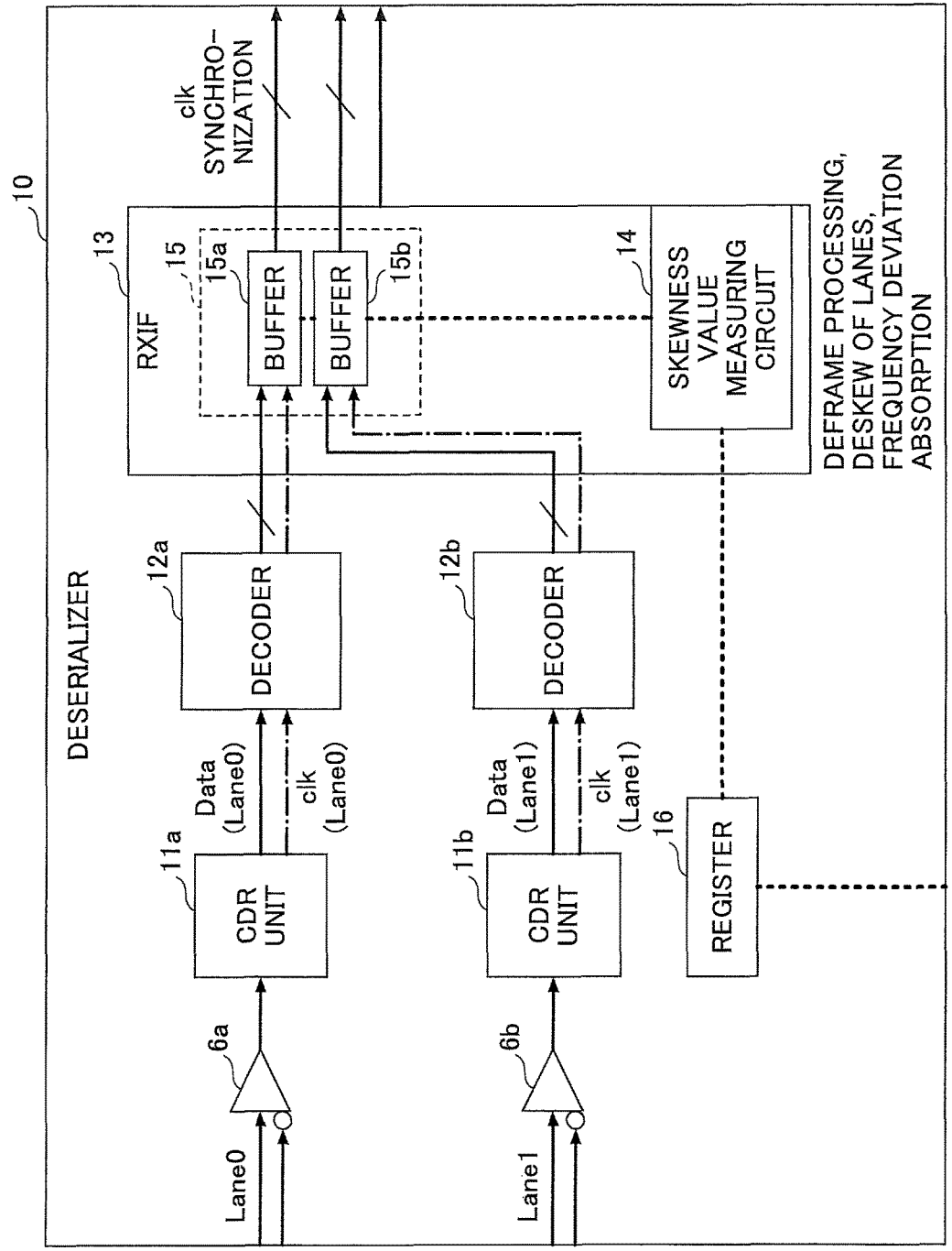
FIG. 4 is a drawing illustrating a first example of a circuit configuration of a deserializer according to the first embodiment.

FIG. 4 is a drawing illustrating the first example of a circuit configuration of the DES 10. The DES 10 includes the CDR units 11a and 11b, the decoders 12a and 12b, the RXIF 13, a skewness value measuring circuit 14, the buffers 15a and 15b, and a register 16.

The CDR unit 11a extracts a clock signal and transmitted data from serial data received by the receiver 6a, and then provides the serial data to the decoder 12a. Similarly to the CDR unit 11a, the CDR unit 11b provides serial data to the decoder 12b.

Each of the decoders 12a and 12b converts serial data into parallel data. Furthermore, the decoder 12a performs frequency lock detection processing, for detecting a locked condition of signal frequency used in the DES 10, and performs symbol boundary detection processing, for detecting boundaries of each of the control codes and the data codes. Then, the decoder 12a converts the 10-bit parallel data into 8-bit parallel data based on the conversion table illustrated in FIG. 3, so as to output the 8-bit parallel data to the RXIF 13.

The RXIF 13 specifies the tail of the image data based on the STP codes and the length codes included in the STP frame 31. Then, the RXIF 13 removes the STP frame 31 from the variable length code α in order to acquire the image data, and then have the image data stored in the buffers 15a and 15b.

The RXIF 13 initiates read processing in a case where the buffered size of the image data in the buffers 15a and 15b exceeds a predetermined amount. Furthermore, the RXIF 13 initiates read processing, in response to a detection of the tail of the image data. Moreover, the RXIF 13 initiates read processing, in a case where deskewing is required because of an event of a data transmission delay in Lane0 or Lane1. The timing for initiating read processing will be explained below. The buffered size of the image data in the buffers 15a and 15b is measured by the skewness value measuring circuit 14.

Subsequently, the RXIF 13 sends the image data read from the buffers 15a and 15b to the image processor, which will be explained below.

Figure 5:
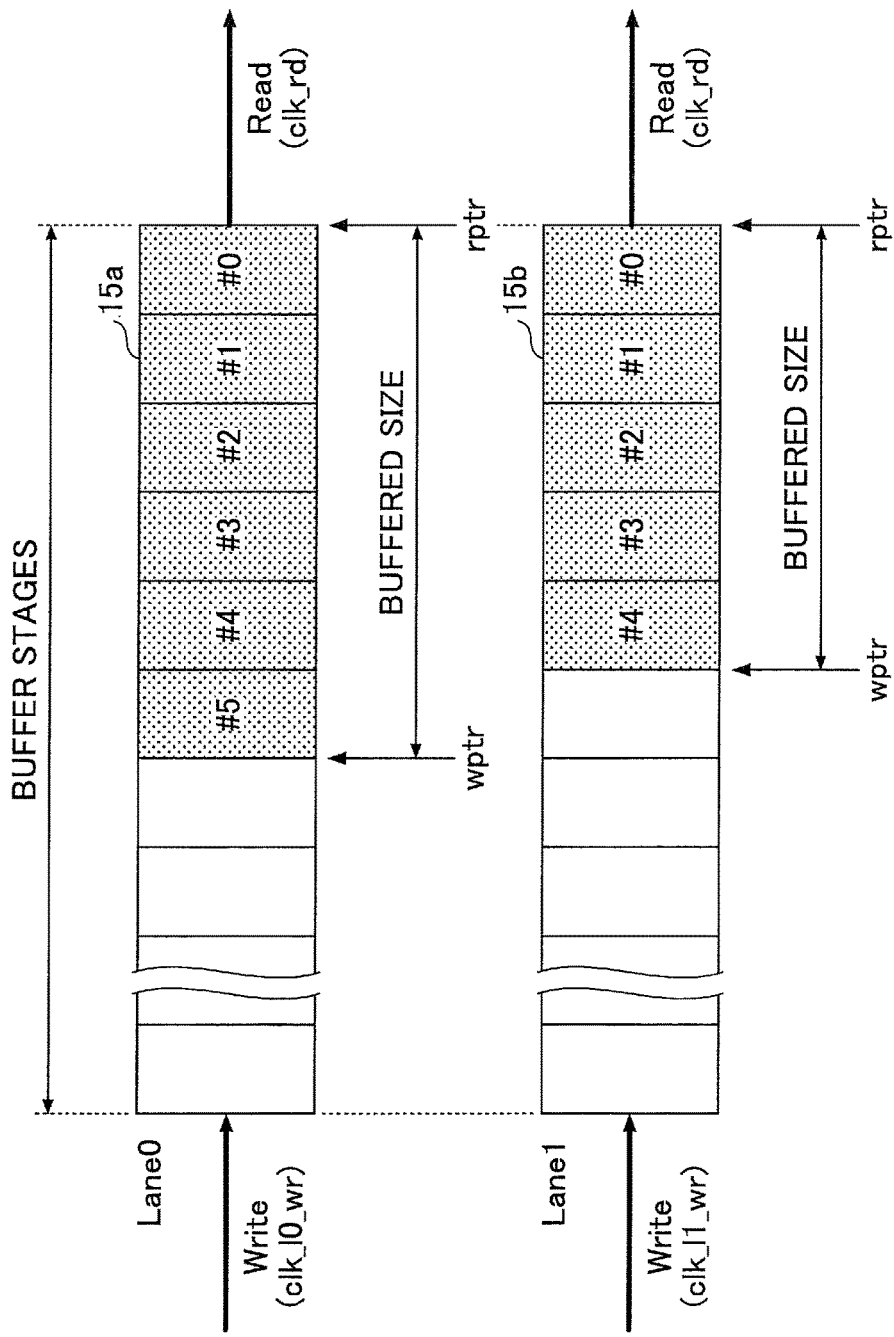
FIG. 5 is a drawing for explaining actions performed by buffers according to the first embodiment.

FIG. 5 is a drawing for explaining actions performed by the buffers 15a and 15b. In FIG. 5, the buffer 15a is illustrated on the upper side and the buffer 15b is illustrated on the lower side. The cells of the buffers 15a and 15b are buffer stages. The buffer stages are recording capacity of the buffers 15a and 15b divided into pieces by a predetermined amount. Upon write processing of image data on the buffers 15a and 15b, the image data are stored in the cells from the right to the left in order. For example, in FIG. 5, as a result of write processing of the image data transmitted through Lane1 on the buffer 15b, the image data are stored in the buffer stages through #0 through #4.

A rptr is set on the right edge of the buffer 15b, and a wptr is set on the tail of the buffer stage #4. The RXIF 13 calculates the difference value between the addresses of the rptr and the wptr, in order to acquire the buffered size of the image data. The RXIF 13 initiates read processing in a case where the buffered size of the image data exceeds a predetermined amount.

Furthermore, the RXIF 13 initiates read processing in a case of detecting that the tail of the image data is output to the buffers 15a and 15b. Specifically, the RXIF 13 may be arranged so as to set the number of buffer stages to be used for storing the image data based on the length codes included in the variable length code α, and then, in a case of detecting that the image data are stored in the set stage, determine that the tail of the image data is output to the buffers 15a and 15b.

For example, the RXIF 13 calculates that the number of buffer stages to be used for storing the image data is five, based on the length codes included in the variable length code α. Then, the RXIF 13 determines that the tail of the image data is output to the buffers 15a and 15b, based on the information that the image data are stored in the buffer stage #5.

Here, the RXIF 13 may be arranged so as to initiate read processing even before detecting that the tail of the image data is output to the buffers 15a and 15b, in a case where the buffered size of the image data exceeds a predetermined amount. In such a case, the RXIF 13 performs read processing while performing write processing until detecting that the tail of the image data is output to the buffers 15a and 15b.

Furthermore, the RXIF 13 may be arranged so that, in an event of a delay in either of the buffers 15a or 15b, one of the buffers 15a and 15b initiates read processing in response to initiation of read processing in the other one of the buffers 15a and 15b. For example, in a case where data stored in the buffer stage #5 of the buffer 15a is the tail of image data, the RXIF 13 initiates read processing from the buffer 15a. Here, the RXIF 13 may be arranged to initiate read processing from the buffer 15b in the same clock as the read processing from the buffer 15a is initiated, even before the tail of the image data is detected in the buffer 15b. In this way, the RXIF 13 synchronizes the processing of the image data in the buffers 15a and 15b per clock. Here, the buffer 15b performs write processing in the meantime of performing read processing.

Figure 6:
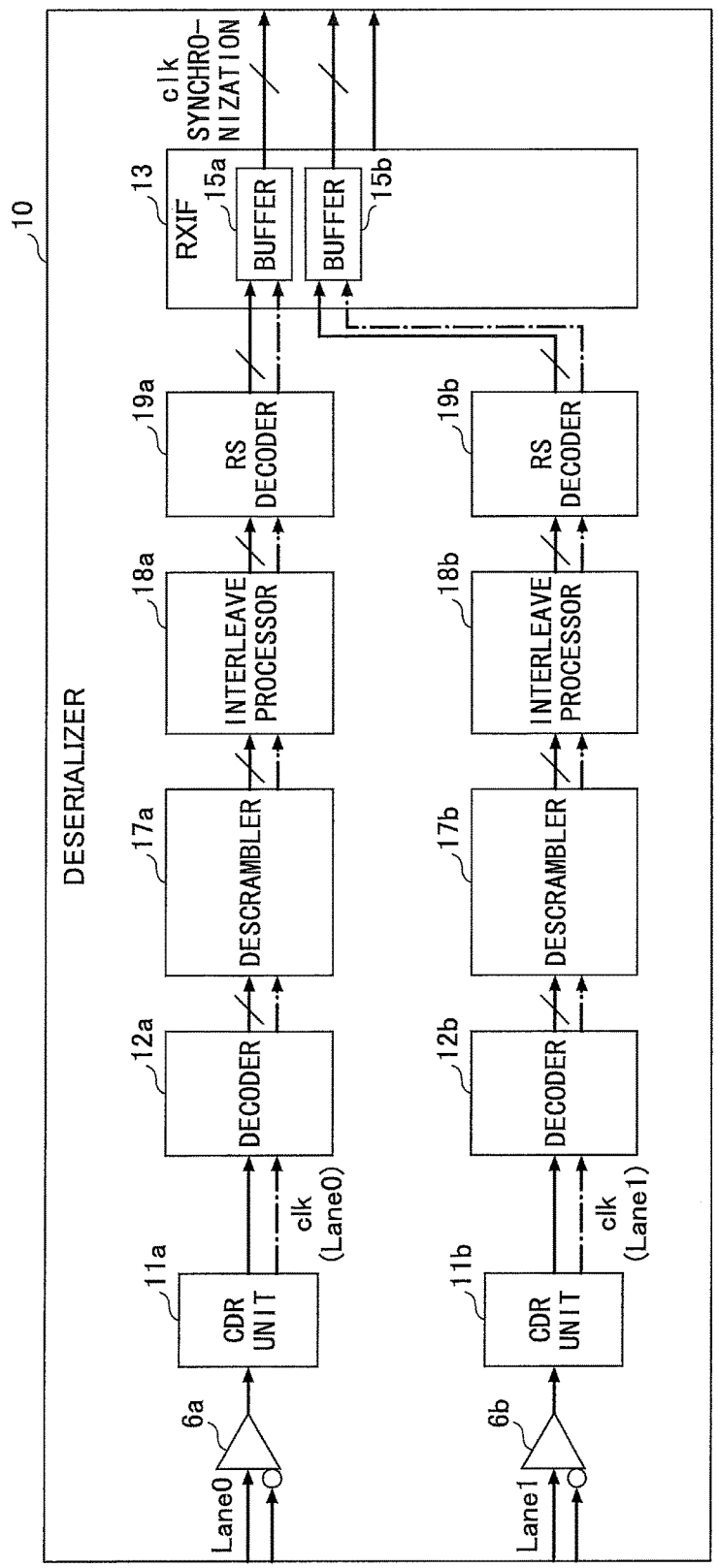
FIG. 6 is a drawing illustrating a second example of the circuit configuration of the deserializer according to the first embodiment.

FIG. 6 is a drawing illustrating the second example of a circuit configuration of the DES 10. The DES 10 includes the CDR units 11a and 11b, the decoders 12a and 12b, descramblers 17a and 17b, interleave processors 18a and 18b, Reed-Solomon (RS) decoders 19a and 19b, the RXIF 13, and the register 16. Furthermore, the RXIF 13 includes the buffers 15a and 15b.

The CDR unit 11a extracts a clock signal and transmitted data from serial data received by the receiver 6a, and then provides the serial data to the decoder 12a. Subsequently, the decoder 12a converts the serial data to parallel data. Then, the descrambler 17a descrambles data which are scrambled by a scrambler (not illustrated in the drawings) of the SER 20. As the SER 20 rearranges the order of data upon outputting data, the interleave processor 18a fixes the order to the original order, so as to prevent burst errors. Subsequently, the RS decoder 19a corrects errors using an error correction code included in the variable length code α, and then deletes the error correction code. Then, the RS decoder 19a outputs a variable length code to the RXIF 13.

Further, the CDR unit 11b, the decoder 12b, the descrambler 17b, the interleave processor 18b, and the RS decoder 19b performs processing similar to the processing described above.

Here, in a case where the DES 10 has the configuration illustrated in FIG. 6, the SER 20 has a scramble processor and an interleave processor although not illustrated in the drawings.

Figure 7:
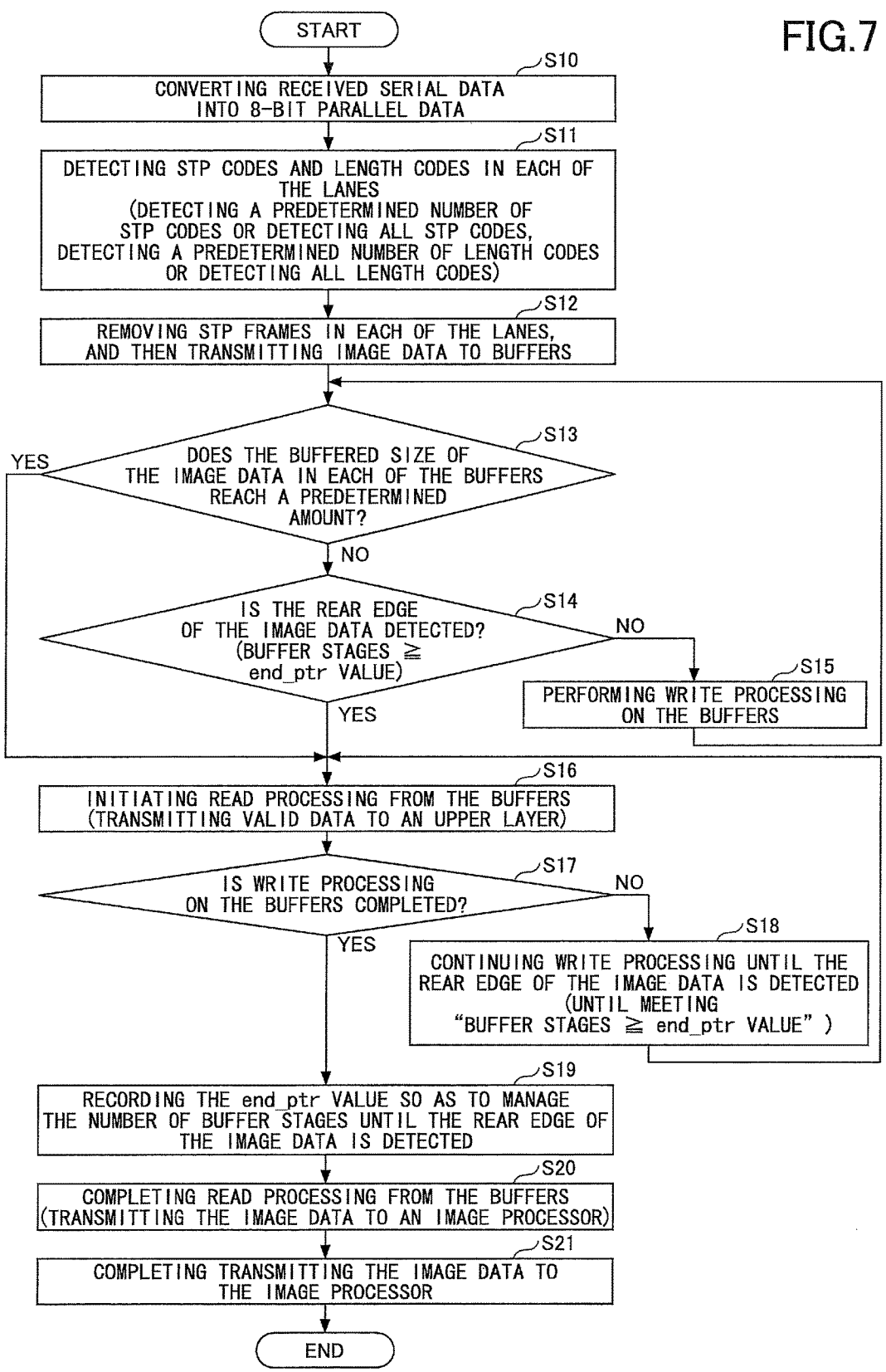
FIG. 7 is a flowchart illustrating an example of receive processing performed by the deserializer according to the first embodiment.

FIG. 7 is a flowchart illustrating an example of receive processing performed by the DES 10. The DES 10 converts received serial data to parallel data, and then converts 10-bit parallel data to 8-bit parallel data based on a predetermined conversion table (step S10). Then, the DES 10 detects STP codes and length codes in each of Lane0 and Lane1 (step S11). In this way, the DES 10 specifies the head and the tail of image data. Here, the DES 10 may be arranged to specify the head and the tail of the image data only in a condition where a predetermined number of STP codes and length codes included in the STP frame 31 are detected. Further, the DES 10 may be arranged to specify the head and the tail of the image data only in a condition where all of the STP codes and the length codes are detected.

The DES 10 removes the STP frame 31 from the variable length code α in each of the Lane0 and Lane1, and then transmits the image data to the buffers 15a and 15b (step S12).

Then, the DES 10 determines whether the volume of the image data stored in the buffers 15a and 15b reaches a predetermined amount (step S13). In a case where the buffered size of the image data in the buffers 15a and 15b reaches the predetermined amount (step S13 YES), the DES 10 proceeds to the processing of step S16. On the other hand, in a case where the buffered size of the image data in the buffers 15a and 15b does not reach the predetermined amount (step S13 NO), the DES 10 proceeds to the processing of step S14. Here, the buffered size of the image data is calculated by the difference between the address of a rptr, which indicates the head of the image data, and the address of a wptr, which indicates the tail of the image data.

In step S14, in a case where the tail of the data is detected (step S14 YES), the DES 10 proceeds to the processing of step S16. On the other hand, in a case where the tail of the data is not detected (step S14 NO), the DES 10 continues write processing in the buffers 15a and 15b (step S15), and then returns back to the processing of step S13.

Here, in step S14, the DES 10 compares the number of buffer stages, in each of which the image data are written, to an end_ptr value, which corresponds to the buffer stage indicative of the tail of the image data. The DES 10 determines that the tail of the data is detected in a case where the number of written buffer stages matches the end_ptr value.

The above-described method for detecting the tail of data is just an example. Further, the DES 10 may be arranged to detect the tail of image data based on a comparison of an address of the tail position of the image data written on the buffers 15a and 15b and an address of the position calculated by adding the data length of the image data to an address of the position where writing processing is initiated.

In step S16, the DES 10 initiates read processing from the buffers 15a and 15b (step S16). Then, the DES 10 determines whether write processing on the buffers 15a and 15b is completed (step S17). In a case where the write processing is completed (step S17 YES), the DES 10 proceeds to the processing of step S19. On the other hand, in a case where the write processing is not completed (step S17 NO), the DES 10 continues write processing on the buffers 15a and 15b until the tail of the data is detected (step S18), and then returns back to the processing of step S16.

Here, the DES 10 determines that the write processing to the tail of the data is completed in a case where the number of written buffer stages matches the end_ptr value.

In step S19, the DES 10 records the number of buffer stages as the end_ptr value, in which the tail of the data is detected based on the STP codes and the length codes, so as to maintain the number of buffer stages until the tail of the image data is detected (step S19).

Here, in steps S14 and S18, the DES 10 may be arranged to detect the tail of the data using the end_ptr value recorded in step S19. For example, in step S18, in a case where the number of buffer stages indicative of the tail of the data is 5, the DES 10 sets the end_ptr value 5. In step S18, the DES 10 continues write processing until the number of written buffer stages reaches 5.

Before the DES 10 completes read processing from the buffers 15a and 15b, the DES 10 transmits the read image data to an image processor (step S20). Then, after completing the transmission of the image data to the image processor (step S21), the DES 10 terminates the processing.

The DES 10 performs the processing through steps S10 through S21 until the transmission of all of the image data is completed.

The write processing performed in step S15 and the write processing performed in step S18 will be explained, referring to examples.

For example, the DES 10 continues write processing in step S15 until the tail of the data is detected in the buffers 15a and 15b.

In the case where the tail of the data is detected in the buffer 15a, the DES 10 initiates read processing in the buffer 15a (step S16) as well as in the buffer 15b (step S16).

With regard to the buffer 15a, as the write processing on the buffer 15a is completed, the DES 10 proceeds to the processing of step S19. On the other hand, as write processing on the buffer 15b is not completed, the DES 10 continues write processing in step S18 while performing read processing of step S16. The DES 10 continues write processing on the buffer 15b in step S18, until the tail of the data is detected.

As described above, as a buffer region to be used when removing control codes becomes smaller according to the first embodiment, the energy consumption in the DES 10 can be reduced.

Second Embodiment

The DES 10 may be arranged to specify the tail position of the image data based on an END code of a variable length code, which is disposed on the tail of the image data. The END code is a control code which indicates the end of valid data (K code).

In such a case, the END code is used for supporting or improving the accuracy of detecting processing of the tail of the data according to the first embodiment. The configuration of the serial communication apparatus 1 is the same as in the first embodiment, and therefore the explanation will be omitted here.

Figure 8:
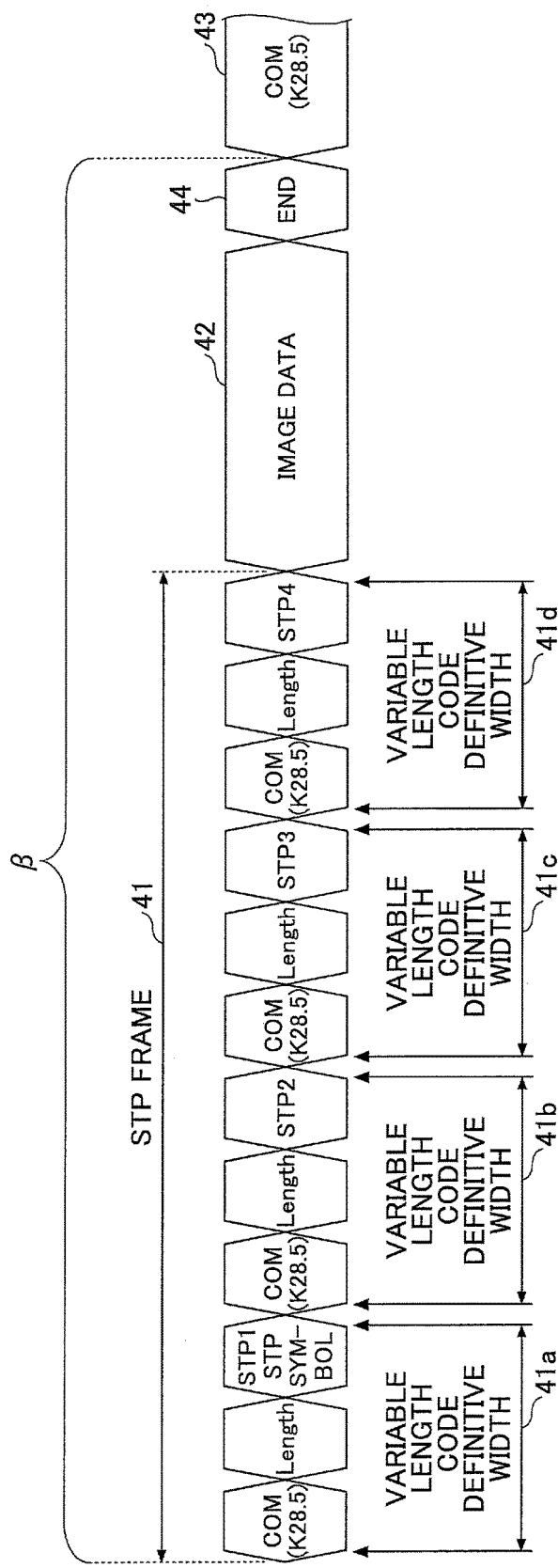
FIG. 8 is a drawing illustrating a second example of a variable length code according to a second embodiment.

FIG. 8 is a drawing illustrating the second example of a variable length code. A variable length code β is a combination of an STP frame 41, an image data 42, and an END code 44. A COM code 43 is disposed between the variable length code β and another variable length code.

The STP frame 41 consists of combinations of COM codes, length codes (referred to as "Length" in FIG. 8), and STP codes. COM codes are disposed between STP codes in other control codes and length codes in the same control codes, respectively. The length codes indicate the data length of the image data 42. STP codes indicate the head position of the image data 42. Here, although the number of combinations of COM codes, length codes (Length), and STP codes which constitute the STP frame 41 is four in the explained example, the number of the combinations may be more than five and less than three.

Each of the STP codes indicates the head position of the image data 42. The RXIF 13 of the DES 10 calculates the tail position of the image data 42 by adding the data length indicated by length codes to the head position. The RXIF 13 determines whether there is the END code 44 on the tail position of the image data 42. The RXIF 13 specifies the tail position of the image data 42 in a condition where there is the END code 44 on the tail position of the image data 42.

Here, the RXIF 13 may be arranged to specify the tail position of the image data 42 in an additional condition where all of the detected values of multiple length codes are the same.

In such a way, as the tail position of image data is detected in a condition of detecting an END code at the tail position of the image data, the reliability of detecting the tail position of image data is enhanced.

Here, the number of END codes disposed at the tail position of image data may be just one, and therefore the data length of the variable length code β can be shorter. In this way, a buffer region to be used when removing control codes becomes smaller, and therefore the energy consumption can be reduced.

Further, the SER 20 may be arranged so as to be capable of disposing a cyclic code and an error correction code in the front and rear sides of the END code 44 and the DES 10 may be arranged so as to detect and process the disposed cyclic code and the error correction code.

The serial transmission according to the first and the second embodiment is applicable to a communication system including multiple apparatuses. Here, an example of an application of the serial transmission according to the first and the second embodiment to a communication system will be explained.

Figure 9:
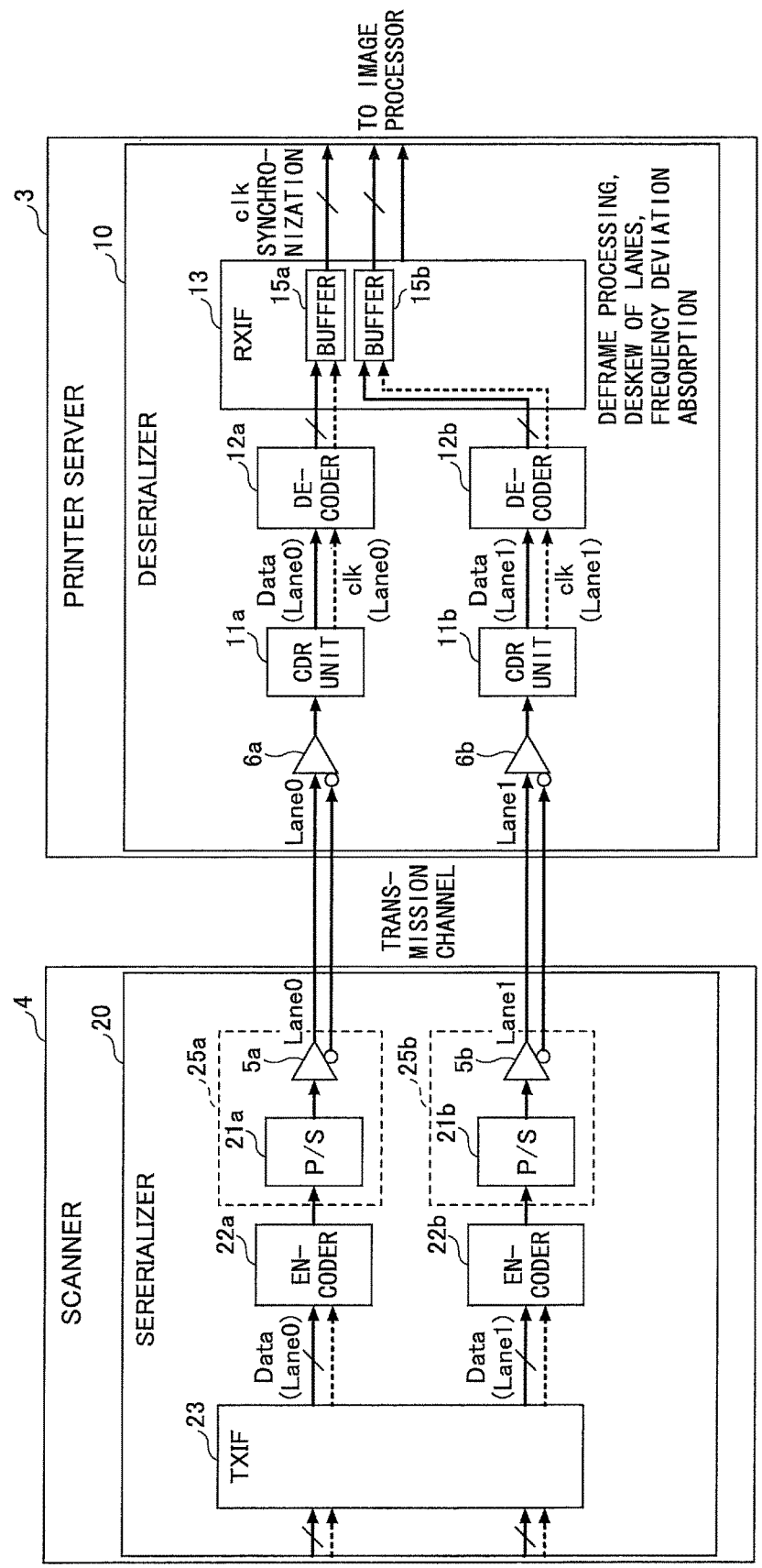
FIG. 9 is a drawing illustrating an example of a configuration of a communication system according to the second embodiment.

FIG. 9 is a drawing illustrating an example of a configuration of a communication system 2. The communication system 2 includes a printer server 3 (receiving device) and a scanner 4 (transmitting device). The printer server 3 includes the DES 10. Further, the scanner 4 includes the SER 20. In such a way, the serial transmission according to the first and the second embodiments may be applied to an inter-device communication.

Furthermore, although the number of channels of the serial transmission is two and the number of buffers is two in the first embodiment, the numbers are not limited to two. The number of channels and buffers may be just one, or four or eight links.

Furthermore, in the first embodiment, a cyclic code and an error correction code may be disposed in the rear side of the image data 32.

Here, in the embodiments, the buffers 15*a* and 15*b* are examples of a memory. The RXIF 13 is an example of a processor. The TXIF 23 is an example of an adder. The serial transmitter 25 is an example of a transmitter. The image data is an example of received data. The STP code is an example of a start code. The END code is an example of an end code.

Further, the present invention is not limited to these embodiments, but various variations and modifications may be made without departing from the scope of the present invention.

As explained in the above description, a detection of the tail position of valid data performed by a receiver can be simplified, so as to reduce energy consumption.

What is claimed is:

1. A serial communication apparatus comprising:
   an adder configured to add a plurality of start codes and a plurality of length codes to a head of data, the plurality of start codes indicating the head of the data and the plurality of length codes indicating a length of the data;
   a transmitter configured to convert the data together with the added start codes and the added length codes into a serial format and to transmit the converted data including the start codes and the length codes;
   a receiver configured to receive the converted data transmitted from the transmitter; and
   a processor configured to detect the start codes and the length codes included in the received converted data, to specify the head of the data based on the detected start codes, to specify a tail of the data based on the detected start codes and the detected length codes, and to process the converted data based on the specified head and the specified tail of the data.

2. The serial communication apparatus according to claim 1, wherein the processor stores the received converted data in a memory in an order from a head of the converted data to a tail of the converted data, and then reads out the stored converted data in the order from the head of the converted data to the tail of the converted data.

3. The serial communication apparatus according to claim 1, wherein the processor specifies the tail of the data in a case of detecting two or more of the length codes having a same value.

4. The serial communication apparatus according to claim 1,
   wherein the adder adds at least one end code to the tail of the data, and
   wherein the processor specifies the tail of the data in a case of detecting the end code.

5. The serial communication apparatus according to claim 1, wherein the processor starts reading out the converted data in a case where the converted data are stored in a memory up to the specified tail of the data or in a case where the converted data are stored in the memory up to a predetermined amount.

6. A communication system comprising:
   a transmitting device; and
   a receiving device,
   wherein the transmitting device includes:
   an adder configured to add a plurality of start codes and a plurality of length codes to a head of data, the start codes indicating the head of the data and the length codes indicating a length of the data, and a transmitter configured to convert the data together with the added start codes and the added length codes into serial format data and to transmit the serial format data to the receiving device, and wherein the receiving device includes:

a receiver configured to receive the serial format data transmitted from the transmitter, and a processor configured to convert the received serial format data into parallel format data and then store the parallel format data in a memory, to detect the start codes and the length codes included in the parallel format data, to specify the head of the data based on the detected start codes, to specify a tail of the data based on the detected start codes and the detected length codes, and to process the parallel format data based on the specified head and the specified tail of the data.

7. A method for communication performed by a serial communication apparatus, the method comprising:

adding a plurality of start codes code and a plurality of length codes to a head of data, the start codes indicating the head of the data and the length codes indicating a length of the data;

converting the data together with the added start codes and the added length codes into serial format data and transmitting the serial format data;

receiving the transmitted serial format data;

converting the serial format data into parallel format data and storing the parallel format data in a memory;

detecting the start codes and the length codes included in the parallel format data;

specifying the head of the data based on the detected start codes;

specifying a tail of the data based on the detected start codes and the detected length codes; and extracting the data based on the specified head and the specified tail of the data.

* * * * *